United States Patent [19]
Skinner, II

[11] Patent Number: 5,829,811
[45] Date of Patent: Nov. 3, 1998

[54] MULTIPOSITION LOCKING GRIPPER ASSEMBLY

[76] Inventor: Frank Raymand Skinner, II, #300 A, 3302 S. New Hope Rd., Gastonia, N.C. 28056

[21] Appl. No.: 510,822

[22] Filed: Aug. 3, 1995

[51] Int. Cl.⁶ .................................................. B25J 15/00
[52] U.S. Cl. .......................... 294/88; 188/67; 294/103.1; 294/119.1; 901/39
[58] Field of Search ............................... 294/82.28, 86.4, 294/88, 93, 94, 102.1, 103.1, 119.1; 188/67; 269/25, 32, 34, 89, 90, 188, 191, 218; 901/31, 36, 37, 39

[56] References Cited

U.S. PATENT DOCUMENTS

| | | | |
|---|---|---|---|
| 1,031,637 | 7/1912 | Fischer | 294/82.28 X |
| 2,222,941 | 11/1940 | Freeman | 294/103.1 X |
| 2,800,819 | 7/1957 | Smith | 188/67 X |
| 2,888,104 | 5/1959 | Frayer | 188/67 X |
| 3,586,138 | 6/1971 | Engle | 188/67 X |
| 4,572,564 | 2/1986 | Cipolla | 594/119.1 X |
| 4,577,732 | 3/1986 | Gottling | 188/67 |
| 4,723,806 | 2/1988 | Yuda | 294/119.1 |
| 5,163,729 | 11/1992 | Borcea et al. | 294/119.1 |

Primary Examiner—Johnny D. Cherry
Attorney, Agent, or Firm—Dougherty & Dremann

[57] ABSTRACT

A multiposition locking mechanism for use in industrial grippers capable of restraining substantially infinite forces including: an angular or conical surface; a locking part; a release part; a force surface for establishing locking forces; a plurality of cylindrical or spherical parts such that the mechanism is capable of moving and locking and releasing a jaw device at more than one discrete point with a maximum of one motor device operatively attached to the jaw device.

19 Claims, 12 Drawing Sheets

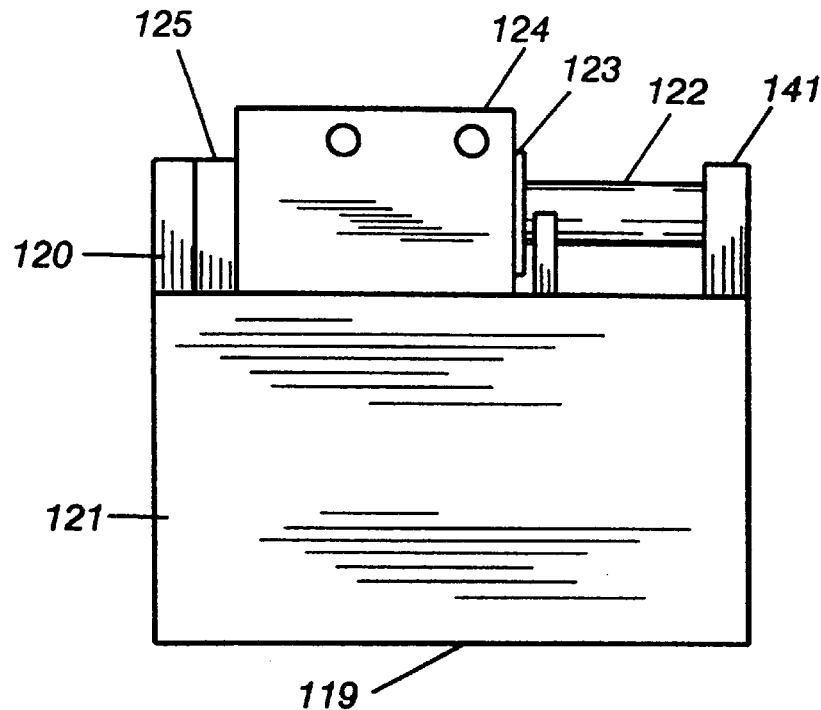
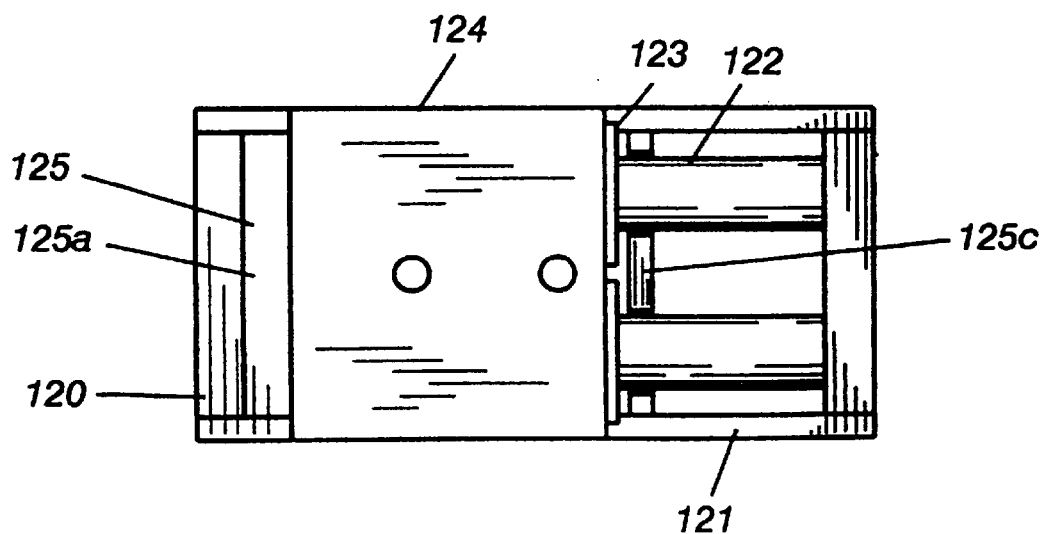

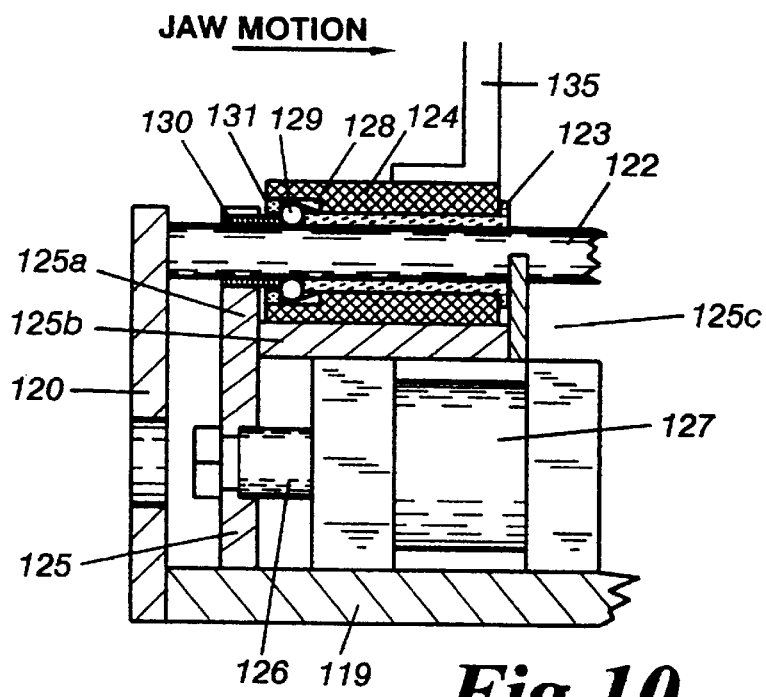
Fig. 9
JAW MOTION
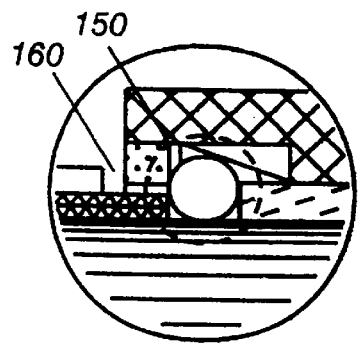
Fig. 9-a
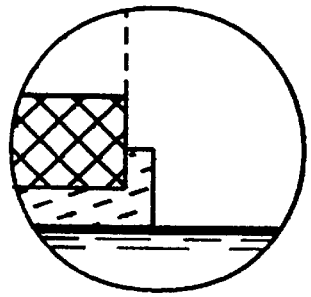
Fig. 9-b
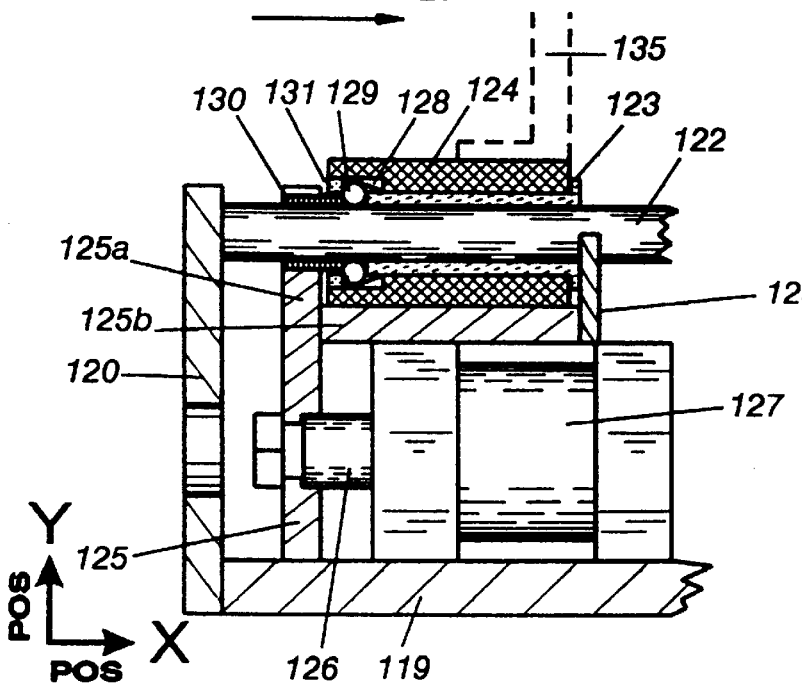
Fig. 10
JAW MOTION HAS STOPPED
RELEASE MOTION CONTINUES
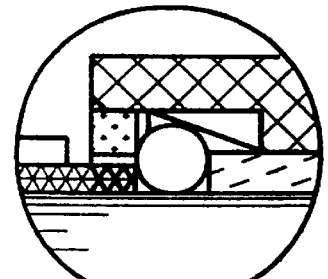
Fig. 9-a
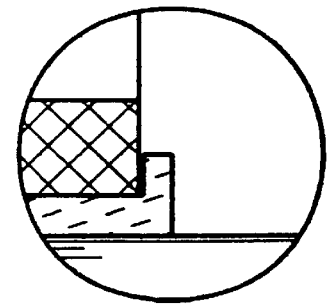
Fig. 10-b

Fig.11
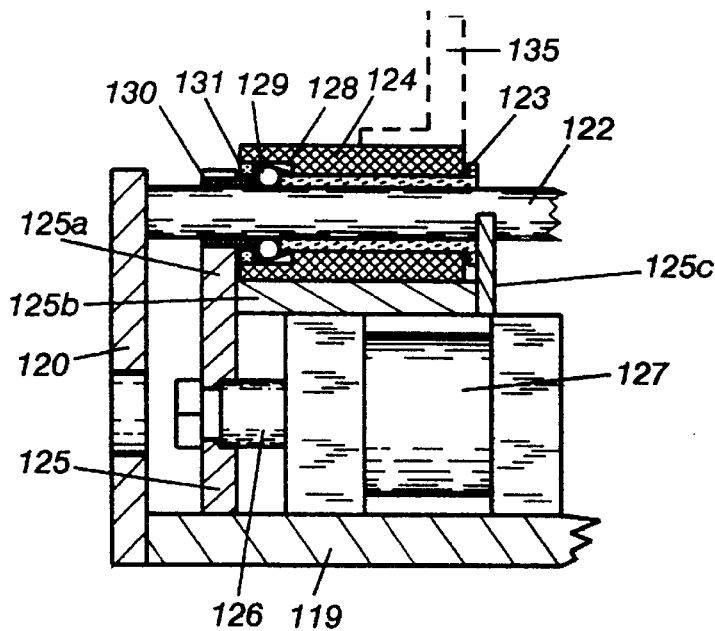
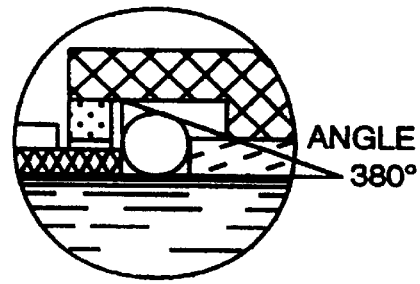
*Fig.11-a*
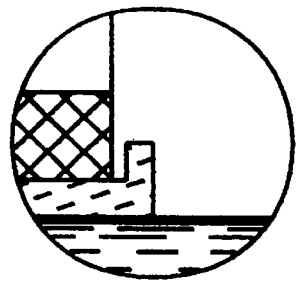
*Fig.11-b*
Fig.12
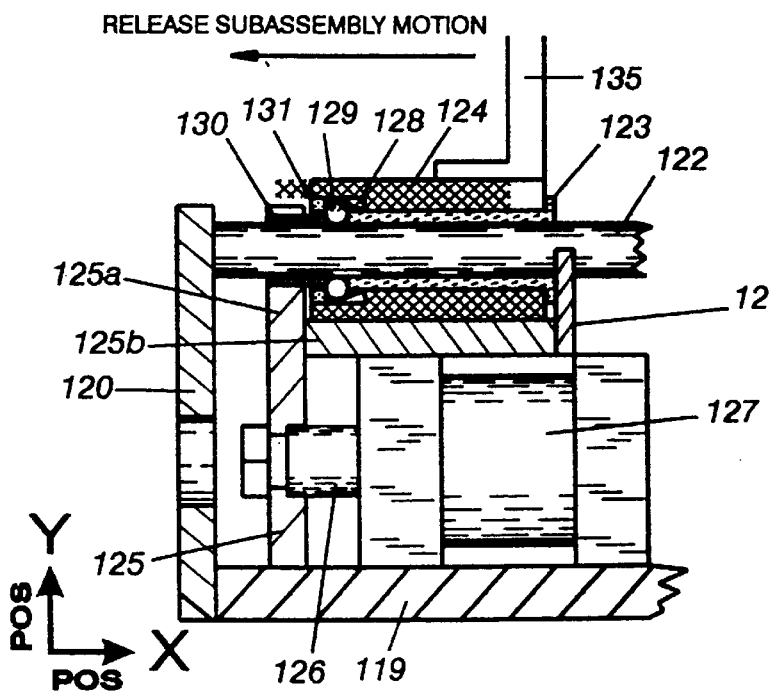
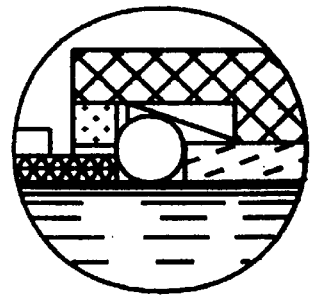
*Fig.12-a*
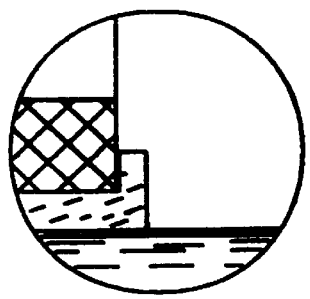
*Fig.12-b*

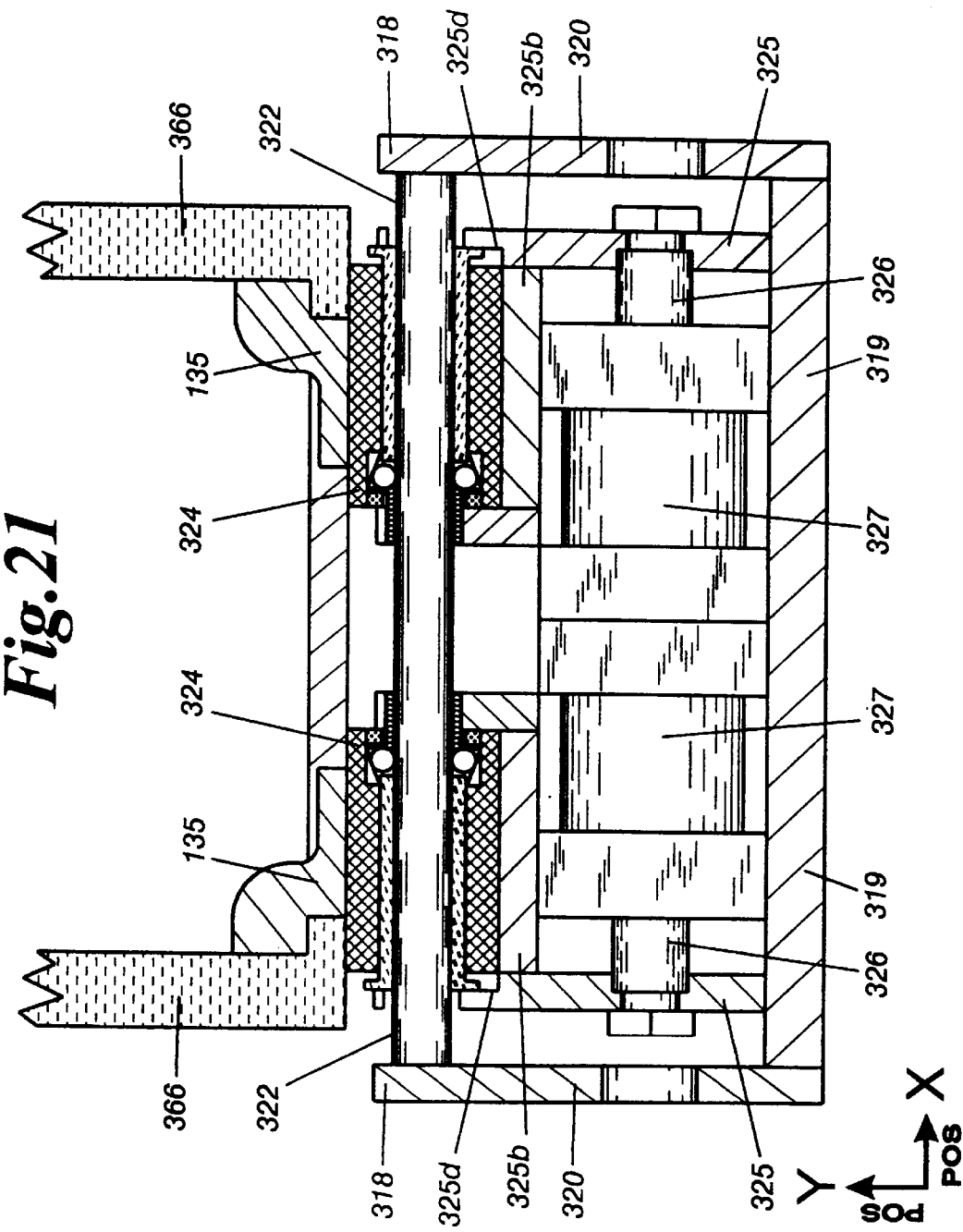

MULTIPOSITION LOCKING GRIPPER ASSEMBLY

FIELD OF THE INVENTION

The present invention relates to a gripper assembly, and more particularly to a gripper assembly having multiple locking positions.

BACKGROUND OF THE INVENTION

For many years automation and industrial robot users have been searching for an end effector that would allow them to close and lock on parts of various sizes. Size variations could reflect changes in production models, severely oversized and undersized parts, or gripping totally different parts presented from totally different feed stations. Self-locking grippers that could close and lock in one position, without adjustment, are available on the market. Non-locking grippers that could close on objects of various sizes are available. Fluid power specialists designed gripping devices with check valves to inhibit the release of a non-compressible fluid. However, fluid power devices would eventually release the high pressure fluid into a low pressure containment, and the mechanical force of the gripping device would reduce to zero. High acceleration, high force and long periods of time would cause these devices to release the payload object. A self-locking gripping mechanism will close and hold the payload object regardless of the force and regardless of the reason for failure (external to the gripping mechanism).

SUMMARY OF THE INVENTION

The invention disclosed overcomes these and other problems associated with the prior art by providing a force locking mechanism that achieves a true self-locking mode, independent of external media inputs. This unique mechanism is capable of locking at any position along a jaw-finger stroke path. The invention comprises generally one or more movable jaw devices, a number of spherical or cylindrical locking devices, a releasing sleeve, a locking sleeve which is built into a slide subassembly, a retaining ring to contain the locking devices, rods for the jaws to translate upon, a motor means to translate the slide and other parts, a release sleeve and structural members including a base plate, side plate and endplate.

A linear motor means is used to translate a jaw subassembly along a true linear axis. The linear motor means can be supplied by a connection with a fluid cylinder or by a transmission device with a rotary motor device. Locking the force locking mechanism fingers does not lock the motor means. There is no direct input to output relationship between the motor means and the jaw subassembly and the fingers. A small translational distance between the jaw subassembly and the slide subassembly allows the jaw subassembly and adjacent components to move within the slide subassembly. This small translation results in additional control over two or more functions without the addition of a second degree of freedom. A single air cylinder and jaw subassembly can achieve movement, locking and unlocking of the translated fingers.

Due to a unique, two phase operation of the motor means, slide subassembly and jaw subassembly, it is possible to move a finger through a random distance against a payload object. The distance is generally controlled by the size and rigidity of the payload object. A moveable jaw-finger subassembly will self-lock against the payload object. A further ability of the force locking mechanism is to release a lock mode and return to an open position without the addition of a second motor means.

BRIEF DESCRIPTION OF THE DRAWINGS

FIG. 1 is a side view of the single movable finger embodiment of the invention;

FIG. 2 is the top view of the single movable finger embodiment of the invention;

FIG. 9 is a detailed cross sectional view of the lock and release mechanism wherein the jaws are partially opened and the mechanism remains unlocked;

FIG. 9A is a detail view of the jaw subassembly of the lock and release mechanism as seen in FIG. 9;

FIG. 9B is a detail view of the release sleeve of the lock and release mechanism as seen in FIG. 9;

FIG. 10 is a detailed cross sectional view of the lock and release mechanism wherein the jaws have closed to engage a part and immediately prior to the lock mechanism engaging;

FIG. 10A is a detail view of the jaw subassembly of the lock and release mechanism as seen in FIG. 10;

FIG. 10B is a detail view of the release sleeve of lock and release mechanism as seen in FIG. 10;

FIG. 11 is a cross sectional view of the lock and release mechanism wherein the force locking mechanism jaws have closed on a part, motion has stopped and the lock mechanism has engaged;

FIG. 11A is a detail view of the jaw subassembly of the lock and release mechanism as seen in FIG. 11;

FIG. 11B is a detail view of the release sleeve of lock and release mechanism as seen in FIG. 11;

FIG. 12 is a detailed cross sectional view of the lock and release mechanism wherein the releasing mechanism has been engaged, self-locking has been terminated and the force locking mechanism jaws are about to move away from the closed and locked position;

FIG. 12A is a detail view of the jaw subassembly of the lock and release mechanism as seen in FIG. 12;

FIG. 12B is a detail view of the release sleeve of lock and release mechanism as seen in FIG. 12;

FIG. 13A is a detail view of the jaw subassembly of the force locking mechanism as seen in FIG. 13;

FIG. 13B is a detail view of the release sleeve of force locking mechanism as seen in FIG. 13;

FIG. 14A is a detail view of the jaw subassembly of the force locking mechanism as seen in FIG. 14;

FIG. 14B is a detail view of the release sleeve of force locking mechanism as seen in FIG. 14;

FIG. 15A is a detail view of the jaw subassembly of the force locking mechanism as seen in FIG. 15;

FIG. 15B is a detail view of the release sleeve of force locking mechanism as seen in FIG. 15;

FIG. 21 is a front view of an "Open-to-Lock" mechanism with fingers opened and locked inside a payload object.

DETAILED DESCRIPTION OF ILLUSTRATIVE EMBODIMENTS

Definitions of Frequently Used Terms

Arm—A motion mechanism with at least one degree of freedom operated by a motor means.

Close-to-Lock—Moving a gripper's jaws and fingers closed to a lesser displacement where they are locked rigidly in place.

End Effector—A functional device designed to achieve a task while attached to a motion mechanism.

Finger—Gripping devices that are custom adapted to a payload object and that are attached to moveable or stationary jaws.

Fixed Jaw—Stationary parts attached to a mechanism frame that serve as attachment points for stationary fingers.

Force Track Means—A device capable of exerting forces over a displacement distance. Specific examples are a ball bearing, a thrust bearing, a linear guide, and a roller guide.

Gripper—A mechanism designed to exert force and hold a payload object.

Jaw—Moveable parts operated by a mechanisms motor means and normally intended for the attachment of fingers.

Locking—The task of when an end effector encounters and holds a payload object regardless of the force.

Motor Means—A motion output device capable of converting energy inputs into linear or rotary movements.

Open-to-Lock—Moving a gripper's jaws and fingers opened to a greater displacement where they are locked rigidly in place.

Payload Force—The force exerted on an end effector by a payload object due to weight, size, mass, or acceleration.

Payload Object—A workpiece or target object.

Prehension—Gripping or holding.

Random Distance—A translation that can vary from one operating cycle to the next operating cycle Releasing—The task of when an end effector terminates all forces against a payload object.

Robot—A computer controlled motion mechanism with one motor means for each degree of freedom.

Self-Locking—A self-locking mechanism will close and hold a payload object regardless of the force and regardless of the reason for failure (external to the mechanism).

Terminal Device—A functional device designed to achieve a task while attached to a motion mechanism.

First Embodiment

Figure 3:
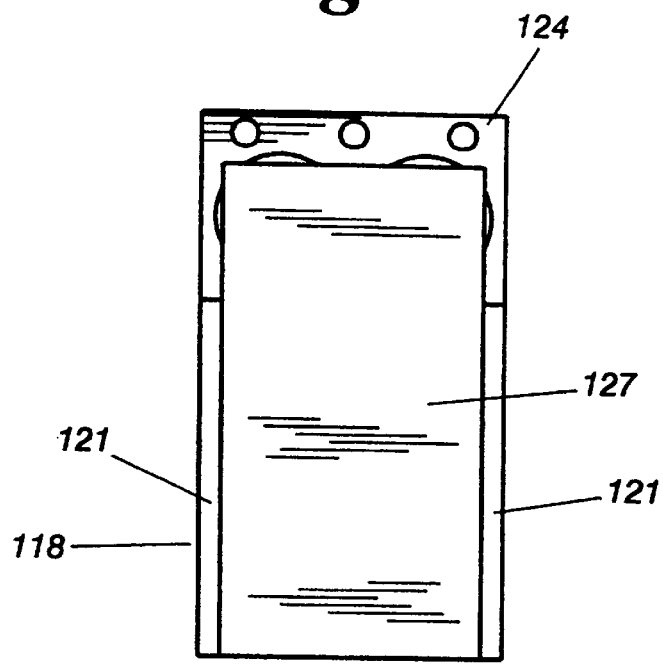
FIG. 3 is an end view of the single movable finger embodiment of the invention, showing mounting holes for the attachment of finger devices.
Figure 6:
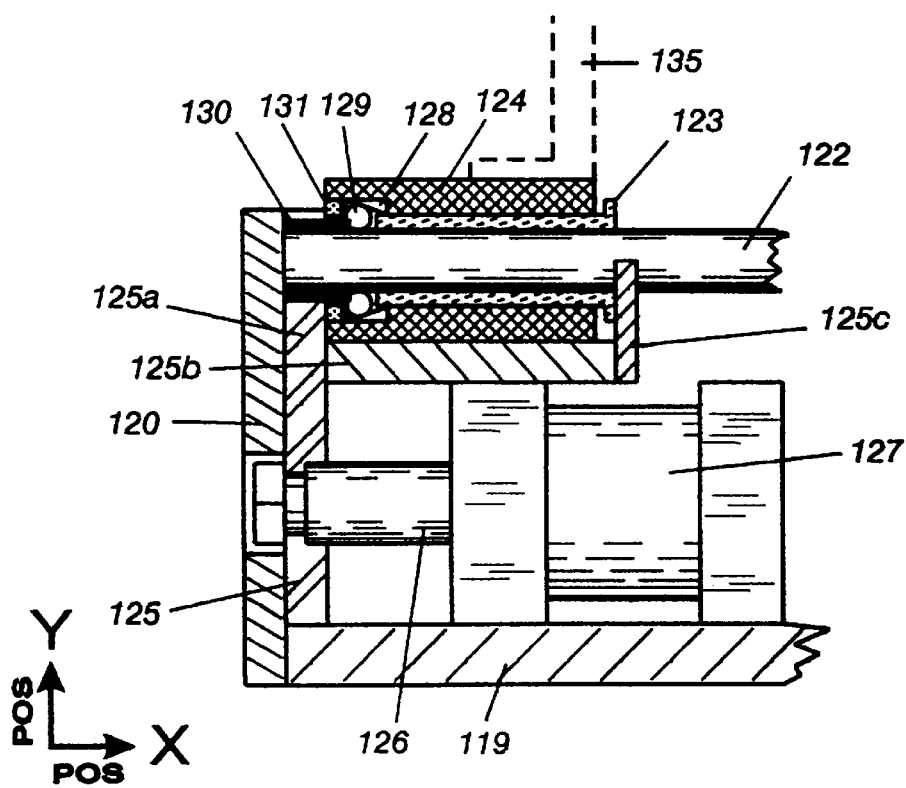
FIG. 6 is a cross sectional view taken along line 6—6 of FIG. 5 showing the lock and slide mechanism in each operating jaw.
Figure 7:
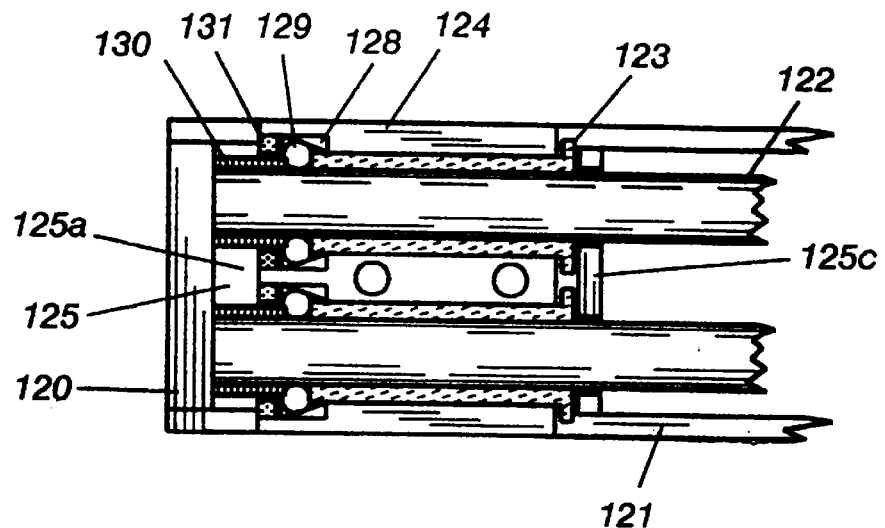
FIG. 7 is a cross sectional view taken along line 7—7 in FIG. 4 showing the lock and release mechanism operating on a pair of supporting rods.
Figure 8:
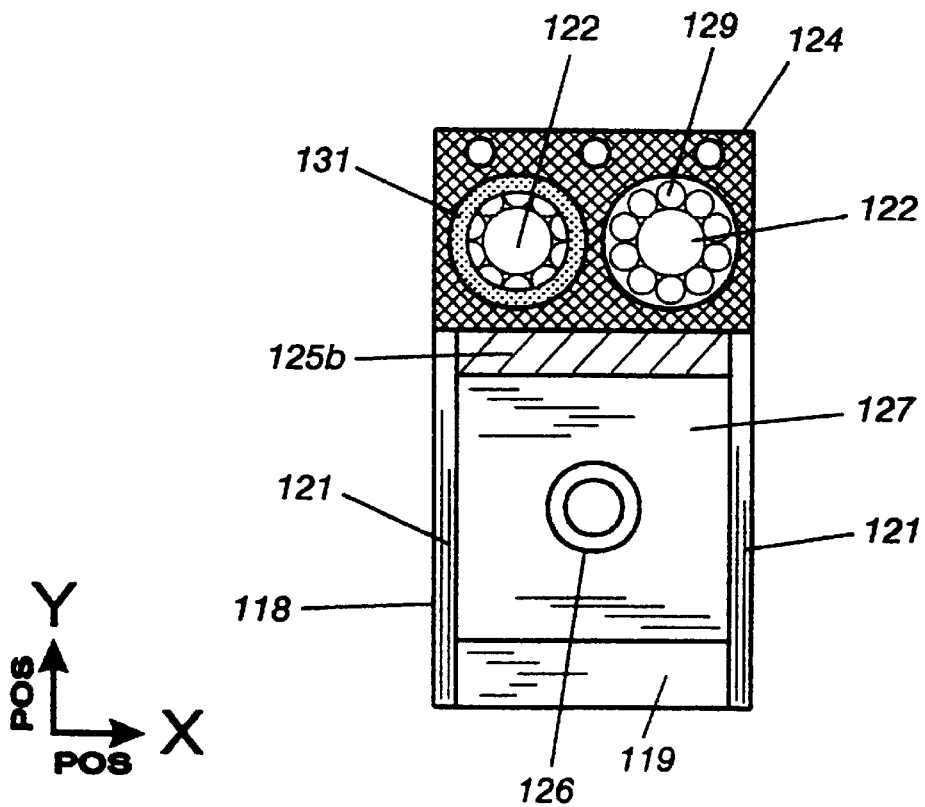
FIG. 8 is a cross sectional end view taken along 8—8 in FIG. 5.

Referring to FIGS. 1–3, it will be seen that the first embodiment of the force locking mechanism is designated by the numeral 118. Generally, the manipulator mechanism 118 includes a base 119 and a plurality of endplate subassemblies 120 attached to a plurality of side plates 121. The endplates 120 encapsulate one or more rods 122, a plurality of release sleeves 123 and a jaw subassembly 124. Referring to FIG. 6, it will be seen that the slide subassembly 125 is composed of four parts, a slide plate 125A, a slide support 125B, a slide end 125C, and a lock sleeve 130. The slide plate 125A is attached directly to a rod of an air cylinder 126. The air cylinder rod 126 and an air cylinder body 127 provide the motor means 127 for this embodiment of the invention.

FIG. 9 shows a detailed view of the self-locking mechanism. The force locking mechanism jaw subassembly 124 contains the release sleeve 123. The release sleeve 123 slides easily within the jaw subassembly 124 and extends through the center of a conical ring 128. A plurality of steel balls 129 are contained within the conical ring 128 where they can be contacted by the release sleeve 123 when it is forced all the way against the face of the jaw subassembly 124 as shown in FIG. 9. The steel balls 129 are held in place by a retaining ring 131. The lock sleeve 130 is part of the slide subassembly 125 and extends inside the retaining ring 131 where it can contact the steel balls 129.

A truly unique relationship between a motor means, the jaw subassembly, and finger devices is invented to achieve this lock and release capability. Most gripping mechanisms have a direct physical contact between a motor means and a jaw subassembly and fingers, resulting in a direct input to output status. Therefore, locking the gripper fingers locks the motor means. However, a motor means 127 in a multi-position force locking mechanism is used to move the slide subassembly 125. The slide subassembly 125 moves the jaw subassembly 124 and fingers 135. There is no direct input to output relationship between the motor means 127 and the jaw subassembly 124 and fingers 135. A small translational distance 160 allows the jaw subassembly 124 and adjacent components to move within the slide subassembly 125. This small translation results in additional control over two or more functions without the addition of a second degree of freedom. The single air cylinder 127 and the jaw subassembly 124 can achieve (1) movement, (2) locking and (3) unlocking of the translated fingers 135. The jaw subassembly 124 self-locks against the force locking mechanism frame, otherwise referred to as the force track surface, and does not lock against the motor means 127.

Second Embodiment

Figure 4:
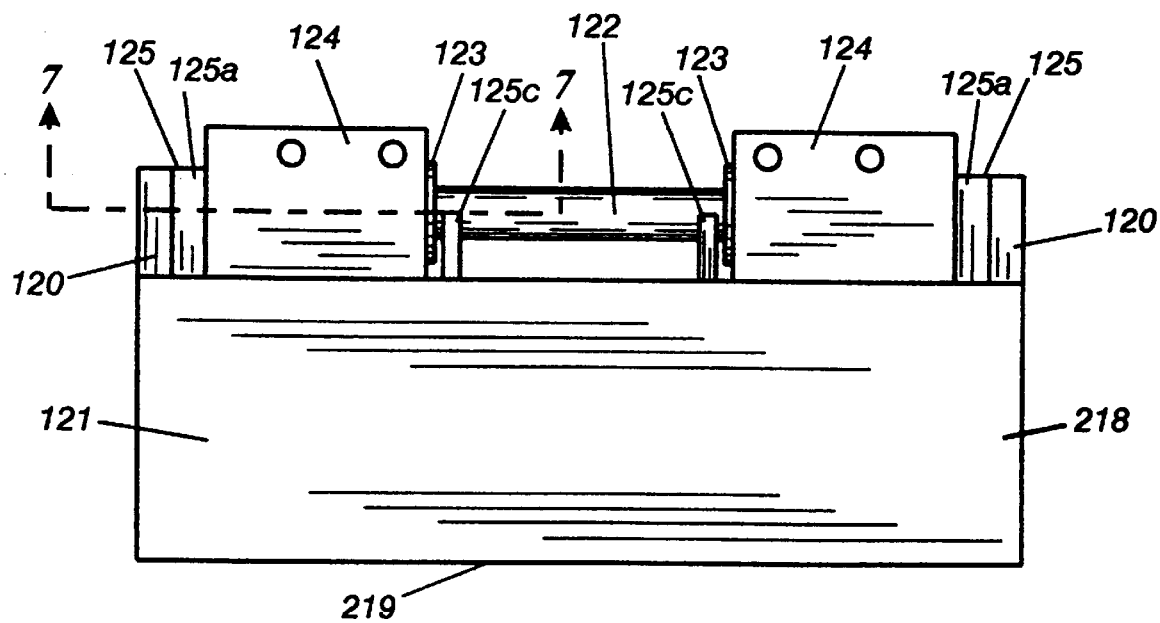
FIG. 4 is a side view of the double movable finger embodiment of the invention.
Figure 5:
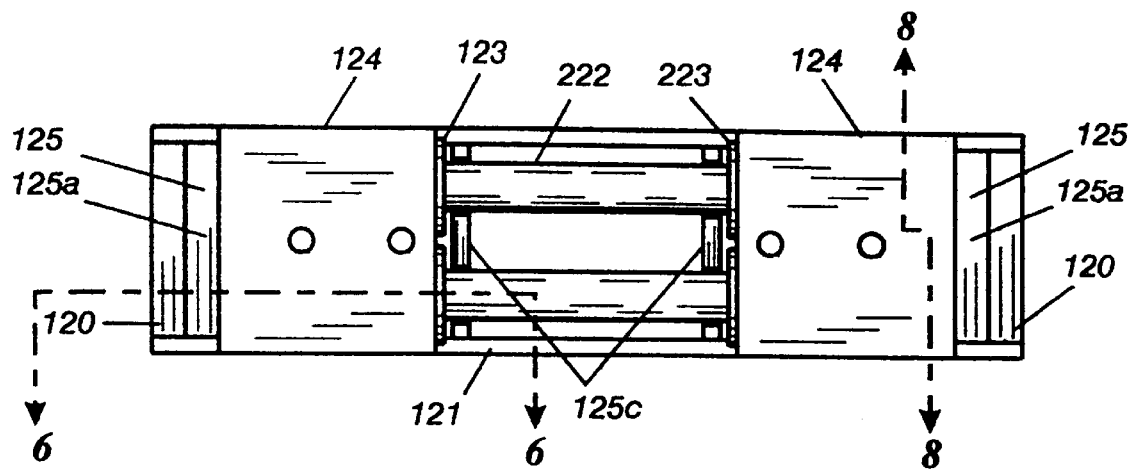
FIG. 5 is a top view of the double movable finger embodiment of the invention.

Referring to FIGS. 4–5, it will be seen that the second embodiment of the force locking mechanism is designated by the numeral 218. Generally, the manipulator mechanism 218 includes a base 219, a plurality of endplate subassemblies 120 attached to a plurality of side plates 221. The endplates 120 encapsulate one or more rods 222, a plurality of release sleeves 123 and a plurality of jaw subassemblies 124. Referring to FIG. 6, it will be seen that the slide subassembly 125 is composed of four parts, the slide plate 125A, the slide support 125B, the slide end 125C, and the lock sleeve 130. The slide subassembly 125 is attached directly to the rod of the air cylinder 126 and the air cylinder body 127. The air cylinder rod 126 and air cylinder body 127 provide the motor means for this embodiment of the invention.

FIG. 9 shows a detailed view of the self-locking mechanism. The self-locking mechanism for the Second Embodiment utilizes substantially identical parts to those described in the First Embodiment. These parts function in a substantially identical manner.

The motor means 127 in the double jaw multiposition force locking mechanism is used to move the slide subassemblies 125. The slide subassemblies 125 move the jaw subassemblies 124 and fingers 135. A small translational distance 160 allows each jaw subassembly 124 and adjacent components to move within the slide subassembly 125. This small translation 160 allows for the locking and unlocking of the fingers 135. Each jaw subassembly 124 self-locks against the rod 222 otherwise referred to as the force track surface.

Third Embodiment

Figure 16:
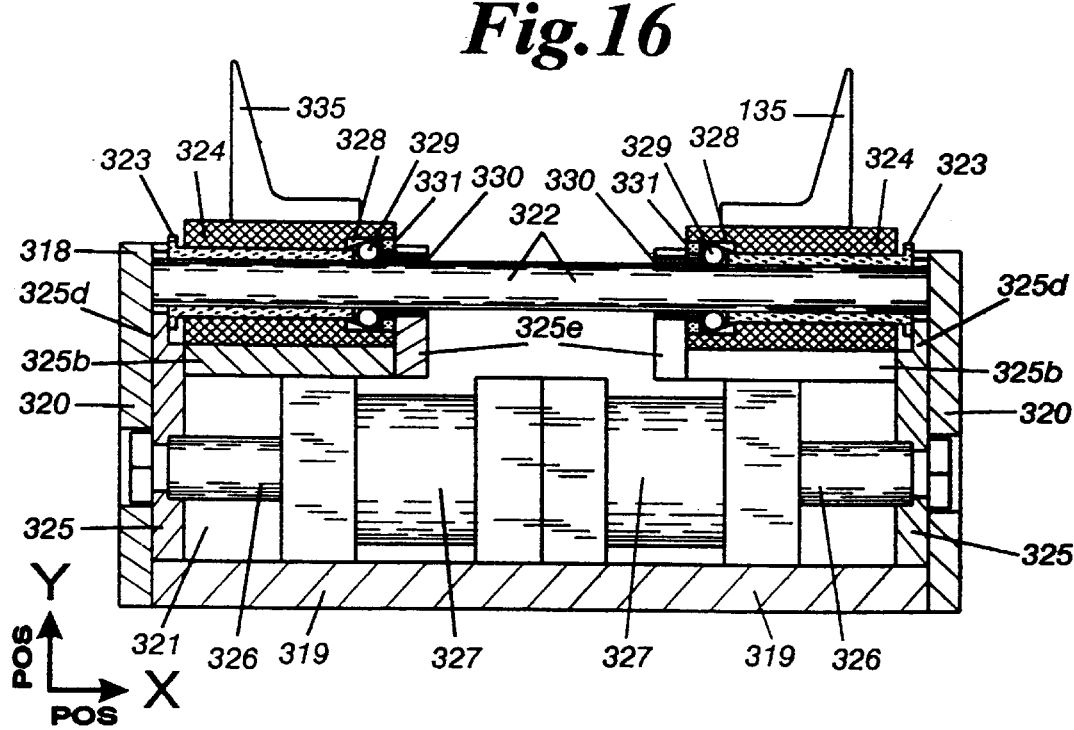
FIG. 16 is a detailed view of the third embodiment of the invention operating in the "Open-to-Lock" mode.
Figure 17:
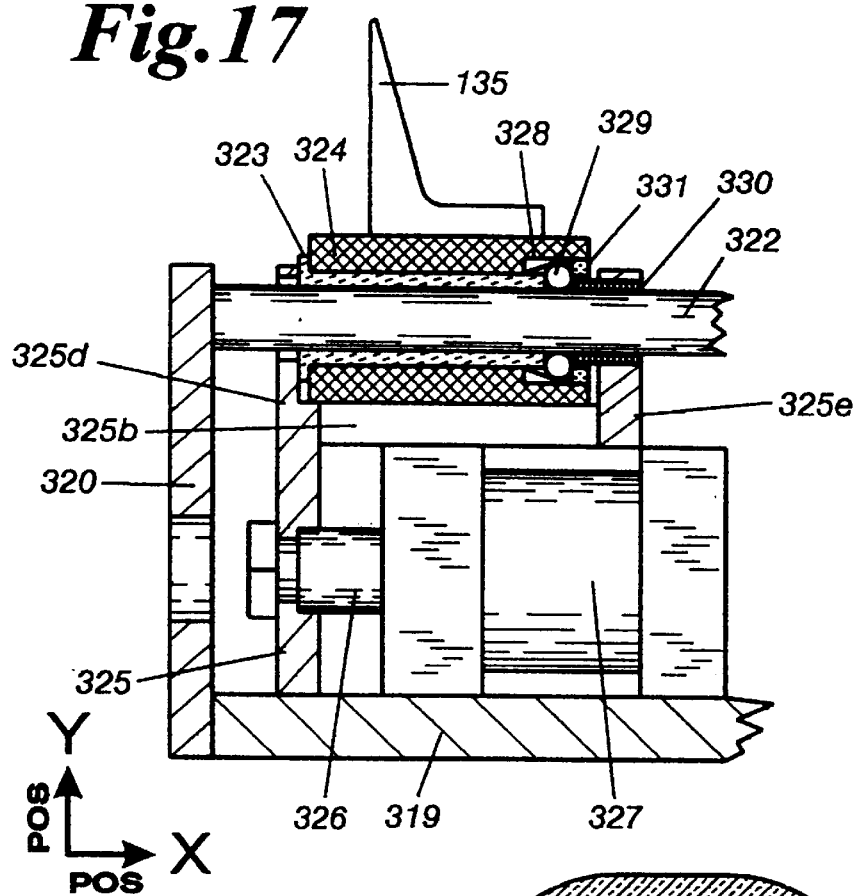
FIG. 17 is a cross sectional view of the Open-to-Lock force locking mechanism showing the lock and release mechanism in each operating jaw.

Many objects are gripped internally in a convenient slot or hole. "Open-to-Lock" prehension is a powerful option of this invention. FIG. 16 shows a force locking mechanism equipped with open to lock capability. Most of the force locking mechanism parts are not changed from previous embodiments of the invention. Generally, a manipulator mechanism 318 includes a base 319, a plurality of endplate subassemblies 320 attached to a plurality of side plates 321. Referring to FIG. 17, it will be seen that a slide subassembly 325 is composed of four parts, a slide plate 325D, a slide support 325B, a slide end 325E, and a lock sleeve 330. The slide plate 325D and slide end 325E are changed (relative to the First and Second Embodiment) to allow the lock sleeve 330 to function at the internal side of a jaw subassembly 324. The jaw subassembly 324, a release sleeve 323, a conical ring 328, steel balls 329 and a retaining ring 331 are all reversed in direction relative to the X axis. The slide subassembly 325 is attached directly to a rod of an air cylinder 326 and an air cylinder body 327. The air cylinder rod 326 and air cylinder body 327 provide the motor means for this embodiment of the invention.

FIG. 9 shows a detailed view of the jaw self-locking mechanism. The self-locking mechanism for the Third Embodiment utilizes substantially the same parts as those described in the First Embodiment. These parts function in substantially the same manner. The direction of locking operation has been changed.

The motor means 127 in the double jaw multiposition force locking mechanism is used to move the slide subassemblies 325. The slide subassemblies 325 move the jaw subassemblies 324 and the fingers 135. A small translational distance 160 allows each jaw subassembly 324 and adjacent components to move within the slide subassembly 325. This small translation allows for the locking and unlocking of the fingers 135. Each jaw subassembly 324 self-locks against the rod 222 otherwise referred to as the force track surface.

OPERATION OF THE INVENTION EMBODIMENTS

Operation of the First Embodiment

The force locking mechanism 118 is an assembly of drives and mechanisms intended for prehension. The force locking mechanism moves a basic part, called the jaw, laterally along an axial path to produce true parallel motion. A stationary member, typically called a fixed jaw, is approached by a moving jaw. Gripping devices, custom adapted to a payload object 166, are attached to the jaws and are usually designated as "fingers". One finger is moved laterally toward the payload object 166 and a stationary finger. The moving finger encounters the object and moves the object into contact with the stationary finger thereby generating forces against the object.

A linear motor means 127 is used to translate the jaw subassembly 124 along a true linear axis. Linear motor means 127 can be supplied by a connection with a fluid cylinder or by a transmission device with a rotary motor device. Locking the mechanism fingers 135 does not lock the motor means 127. Due to the unique, two phase operation of the motor means 127, slide subassembly 125 and jaw subassembly 124,it is possible to move a finger 135 through a random distance against the payload object 166, where the distance is defined by the size and rigidity of the payload object 166. Furthermore, the moveable force locking mechanism jaw subassembly 124 will self-lock against the payload object 166, relative to a rigid stationery object, the rod 122. Furthermore, it is possible to close the moveable force locking mechanism jaw subassembly 124 to any position along the rod 122 and lock the jaw subassembly 124 at such position. Furthermore, it is possible to close and lock the mechanism and subsequently close and lock the mechanism at an additional distance.

One ability of the multiposition force locking mechanism is to close upon objects of various sizes and lock in one or more discrete positions. The mechanism jaw subassembly 324 contains one or more jaw locking and releasing mechanisms that execute this task. A further ability of the force locking mechanism is to release a lock mode and return to an open position without the addition of a second motor means.

Jaw Locking and Release Mechanism

FIG. 9 shows a detailed view of the force locking mechanism. The jaw subassembly 124 contains the release sleeve 123. The release sleeve 123 slides easily within the jaw subassembly 124 and extends through the center of the conical ring 128. A plurality of steel balls 129 are contained within the conical ring 128 where they can be contacted by the release sleeve 123 when it is pressed substantially against the face of the jaw subassembly 124 as shown in FIG. 12. The steel balls 129 are held in place by retaining ring 131. The lock sleeve 130 extends inside the retaining ring 131 and can contact the steel balls 129.

Locking occurs when the lock sleeve 130 (FIG. 11) extends in and against the steel balls 129 forcing them to contact the conical ring 128. An angle 380 between a force track surface, the rod, and the conical ring 128 must be small enough to maintain a self-locking force between the cone, bearings and rod. If the angle 380 is too great, the steel balls 129 will slide free and self-locking does not occur. A further prerequisite of locking is that the jaw subassembly 124 must be forced in a direction consistent with (FIG. 16) the previous closure motion, creating the necessary forces to hold the steel balls 129 in place.

Figure 15:
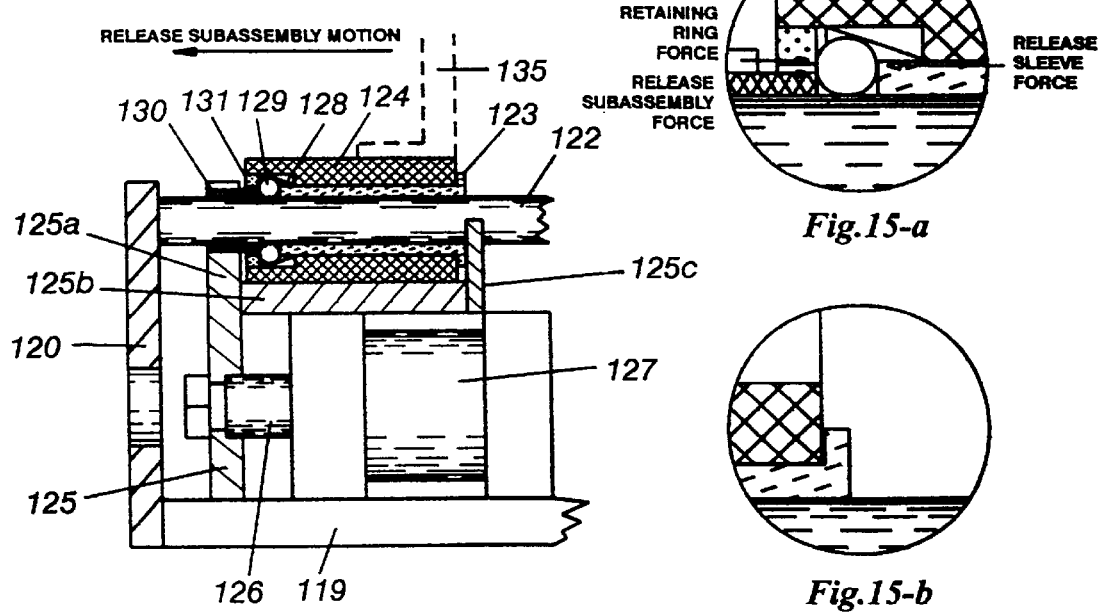
FIG. 15 is a detailed cross sectional view of a force locking mechanism and the forces present as the force locking mechanism jaw(s) open.

To release the jaw subassembly 124, so that they are free to translate, it is necessary to move the release sleeve 123 relative to the jaw subassembly 124 and terminate the forces between the steel balls 129 and conical ring 128. This is achieved when the motor means 127 moves the slide subassembly 125, withdrawing the lock sleeve 130 and pressing the release sleeve 123 against the steel balls 129 as shown in FIG. 15. The only force that the release sleeve 123 encounters, other than minute friction, is the force against the steel balls 129. As shown in FIG. 15, this force becomes sufficient to move the steel balls 129 relative to the jaw subassembly 124, thereby releasing the self-locked mode and returning the force locking mechanism to its original unlocked condition.

Figure 20:
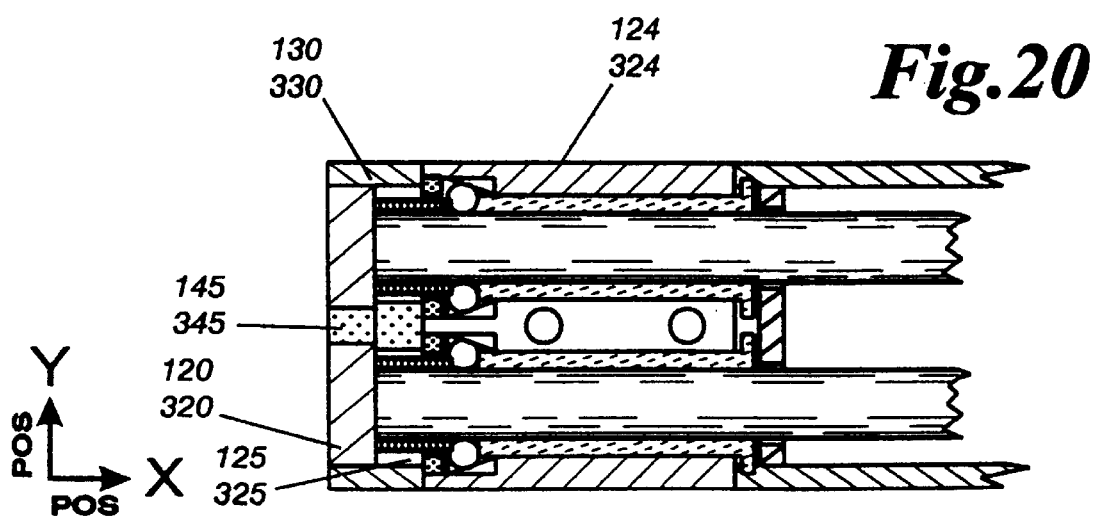
FIG. 20 is a top view of mechanism where a jaw has fully opened and is contacting a stop part.

A stationary pin 145 (reference is made to FIG. 20) extends from the endplate 120 and passes through the slide subassembly 125 to contact the jaw subassembly 124. The stationary pin 145 exerts a force on the jaw subassembly 124 when the slide subassembly 125 reaches a fully opened position. This force prevents the jaw subassembly from contacting the lock sleeve 130 at the end of travel and thereby self-locking at this position.

Dynamic Analysis of the Operation of the Release Mechanism

Figure 13:
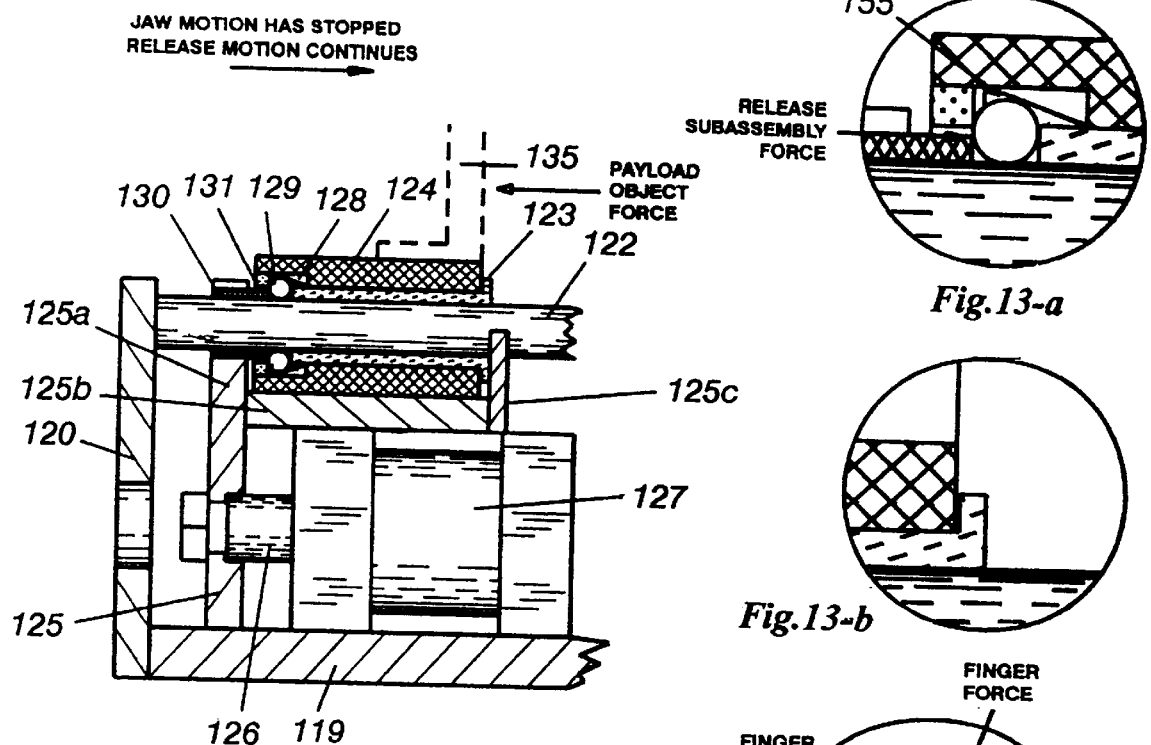
FIG. 13 is a detailed cross sectional view of a force locking mechanism and the forces present as the force locking mechanism jaw(s) close.

As the force locking mechanism closes, very little force is exerted between the steel balls 129 and conical ring 128. This is primarily due to the mass of the release sleeve 123 which slides on the rod 122. As the motor means 127 drives the jaw subassembly 124 closed, the inertia of the mass of the release sleeve 123, combined with the friction forces between the release sleeve 123 and the rod 122, force the release sleeve 123 against the steel balls 129. Reference is made to FIG. 9. The steel balls 129 are trapped in a space 150 between the release sleeve 123 and the lock sleeve 130 and the steel balls 129 are no longer able to physically contact the conical ring 128. The force locking mechanism continues this motion until a force is exerted upon the jaw subassembly 124. Normally, this force would be the physical contact of the force locking mechanism fingers 135 and the payload object 166. At this instance the motor means 127 continues to drive towards a further closed position but the jaw subassembly 124 stops translation due to the forces encountered. Reference is made to FIG. 13. The release sleeve 123 continues motion toward the "fingers closed direction" due to its momentum. The space 150 that existed between the release sleeve 123 and the lock sleeve 130 disappears at this instance and is replaced by a distance 155 between the conical ring 128 and the lock sleeve 130. Reference is made to FIG. 11. The conical ring 128 however, is not moving as it is physically attached to the jaw subassembly 124 which has stopped translation. Therefore the lock sleeve 130 continues motion and presses the steel balls 129 rigidly against the wall of the conical ring 128 and against the outside diameter of the rod 122. Self-locking has occurred.

Figure 14:
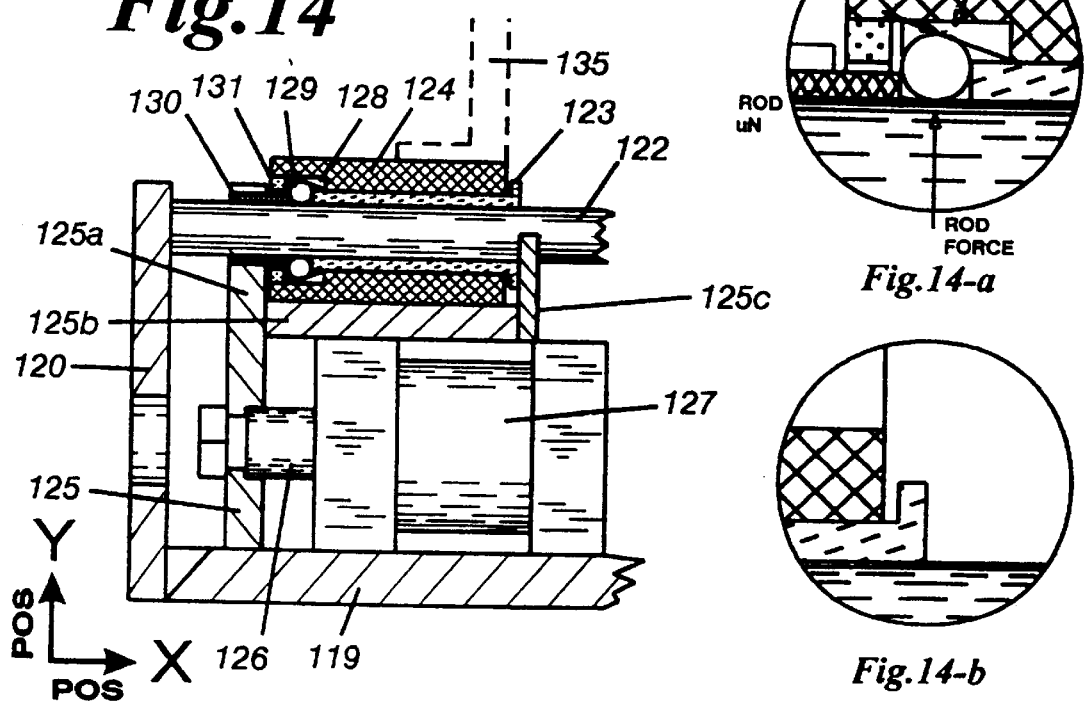
FIG. 14 is a detailed cross sectional view of a force locking mechanism and the forces that are present when the fingers contact the payload object. These forces result in the self-locking of the force locking mechanism.

Once the steel balls 129 are held firmly in place between the rod 122 and the conical ring 128, the position of the jaw subassembly 124 is locked relative to the position of the rod 122 (FIG. 14) Increased force from the payload object (Finger Force) will result in increased force between the rod 122 (Detail 14-A, "Rod Force"), steel balls and jaw subassembly 124 resulting in a statically balanced condition. The jaw subassembly 124 cannot move in the negative X direction, regardless of the magnitude of the force exerted on the jaw subassembly by the payload object 166.

The only functional way to release the force locking mechanism jaw subassembly 124 is to remove the steel balls 129 from the entrapped position between the conical ring 128 and rod 122. This is accomplished when the motor means 127 moves the release sleeve 123 in the negative X direction until it contacts the steel balls 129. Further motion of the release sleeve 123 increases the negative X force on the steel balls 129 until they move in the negative X direction. Force is exerted by the slide subassembly 125 against the release sleeve 123 and against the steel balls 129 until the edge of the release sleeve 123 contacts the jaw subassembly 124. Reference is made to FIG. 15. At this instant self-locking is terminated and the jaw subassembly 124 begins to move in the negative X direction. The slide subassembly 125 continues to apply force against the jaw subassembly 124. The steel balls 129 are constantly forced in the negative X direction away from the conical ring 128 because of the mass and inertia of the jaw subassembly 124. Self-locking does not occur and the force locking mechanism jaw subassembly 124 moves freely to the opened position.

Operation of the Multiposition Force Locking Mechanism

Figure 18:
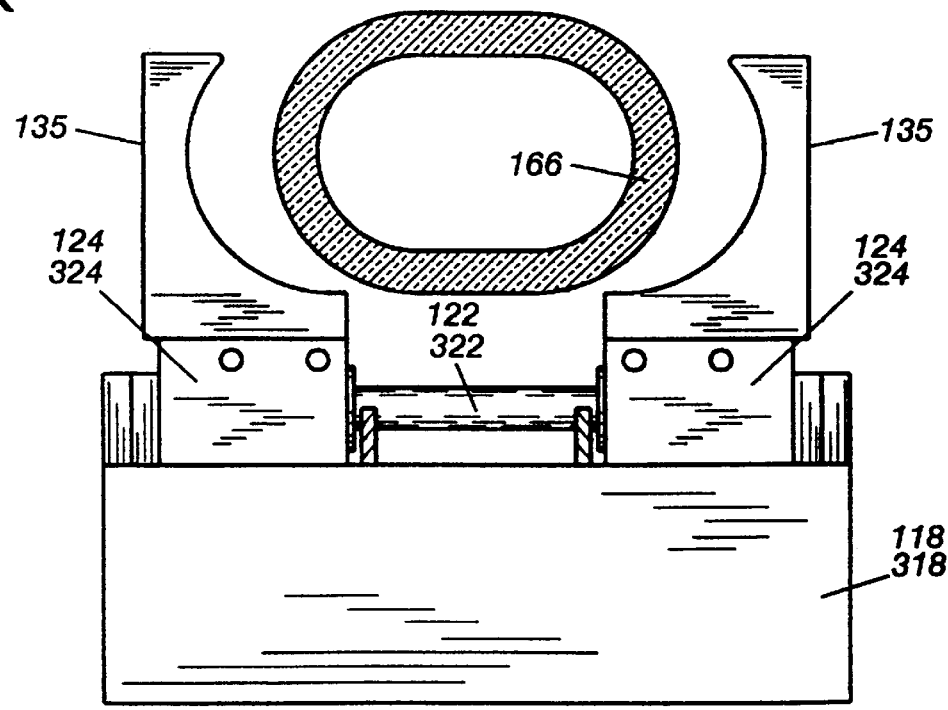
FIG. 18 is a side view of a force locking mechanism wherein the fingers are opened prior to contacting a payload object.
Figure 19:
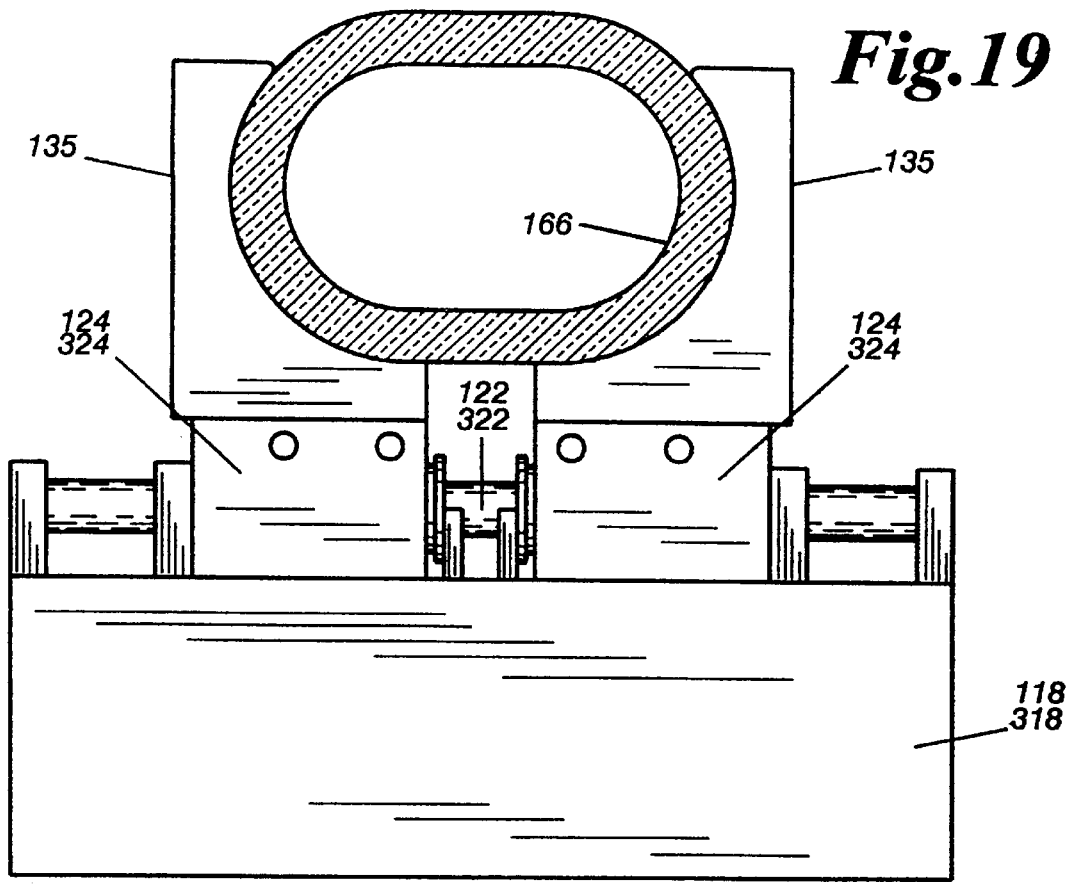
FIG. 19 is a side view of a force locking mechanism wherein he fingers have closed and contacted a payload object.

After fingers 135 are attached to the jaw subassembly 124 of the force locking mechanism 118, it is prepared to grip and retain a payload object 166. FIG. 18 shows the force locking mechanism with fingers 135 opened, prior to closing on a payload object 166. The jaw subassembly 124 is translated by the motor means 127 until contact is made with the payload object 166. FIG. 19 shows the force locking mechanism 118 with fingers 135 attached, after closing on a payload object 166. Contact with a payload object 166 will cause the jaw subassembly 124 to self-lock against the rods 122.

The force locking mechanism can be opened by reversing the forces applied by the motor means 127. The self-locked jaw subassembly 124 releases and moves to an opened position. The payload object 166 is released.

OPERATION OF THE SECOND EMBODIMENT

The force locking mechanism 218 is an assembly of drives and mechanisms intended for prehension. The force locking mechanism moves basic parts, called the jaws, laterally along an axial path to produce true parallel motion. Gripping devices, custom adapted to the payload object 166, are attached to the jaws and are usually designated as "fingers". The moving fingers encounter the payload object 166 thereby generating forces against the object.

A linear motor means is used to translate each jaw subassembly 124 along a true linear axis. Linear motor means can be provided by a connection with a fluid cylinder or by a transmission device and a rotary motor device. Locking the mechanism fingers 135 does not lock the motor means. There is no distinct input to output relationship between the motor means and the jaw subassembly 124 and fingers 135. The small translational distance 160 between the jaw subassembly 124 and the slide subassembly 125 allows the jaw subassembly 124 and adjacent components to move within the slide subassembly 125. This small translation results in additional control over two or more functions without the addition of a second degree of freedom. The single air cylinder 127 and jaw subassembly 124 can achieve (1) movement, (2) locking and (3) unlocking of the translated fingers 135.

Due to the unique, two phase operation of the motor means, slide subassembly 125 and jaw subassembly 124, it is possible to move the finger 135 through a random distance against the payload object 166, where the distance is defined by the size and rigidity of the payload object 166. Furthermore, the moveable jaw subassembly 124 will self-lock against the payload object 166, relative to a rigid stationery object, the rod 122. Furthermore, it is possible to close the moveable force locking mechanism jaw subassembly 124 to any position along the rod 122 and lock the jaw subassembly 124 at such position. Furthermore, it is possible to close and lock the mechanism and subsequently close and lock the mechanism at an additional distance.

Jaw Locking and Release Mechanism

The parts in the jaw lock and release mechanism (FIG. 9) are substantially identical to those used in the First Embodiment. The locking and releasing functions of the Second Embodiment are substantially identical to those of the First Embodiment. Two jaw subassemblies and motor means are used within the single frame to provide two movable fingers.

Dynamic Analysis of the Operation of the Release Mechanism

The dynamics of operation for the Second Embodiment are substantially identical to those of the First Embodiment. Two jaw subassemblies and motor means are used within a single frame to provide two moveable fingers.

Operation of the Multiposition Force Locking Mechanism

After fingers 135 are attached to the jaw subassembly 124 of the force locking mechanism, the mechanism 118 is prepared to grip and move the payload object 166. FIG. 18 shows the force locking mechanism with fingers 135 opened, prior to closing on the payload object 166. The force locking mechanism jaw subassembly 124 is translated by the motor means until contact is made with the payload object 166. FIG. 19 shows the force locking mechanism 118 with the fingers 135 attached, after closing on the payload object 166. Contact with the payload object 166 will cause the force locking mechanism jaw subassembly 124 to self-lock against the rods 122.

The force locking mechanism can be opened by reversing the forces applied by the motor means. The self-locked jaw subassembly 124 releases and moves to an opened position. The payload object 166 is released.

OPERATION OF THE THIRD EMBODIMENT

Force locking mechanisms are normally operated in a mode where the fingers 135 are closed and surround the payload object 166. If locking occurs, this mode is referred to as "Close-to-Lock". However, many objects are gripped internally in a convenient slot or hole. This "Open-to-Lock" prehension is a powerful option of this invention. FIG. 16 shows a force locking mechanism equipped with Open-to-Lock capability. Most of the force locking mechanism parts are not changed from previous embodiments of the invention.

The linear motor means 327 is used to translate the jaw subassembly 324 along a true linear axis. The linear motor means 327 can be supplied by a connection with a fluid cylinder or by a transmission device with a rotary motor device. Locking the force locking mechanism fingers 135 does not lock the motor means 327. There is no direct input to output relationship between the motor means 327 and the jaw subassembly 324 and fingers 135. The small translational distance 160 between the jaw subassembly 324 and the slide subassembly 325 allows the jaw subassembly 324 and adjacent components to move within the slide subassembly 325. This small translation results in additional control over two or more functions without the addition of a second degree of freedom. A single air cylinder 327 and jaw subassembly 324 can achieve (1) movement, (2) locking and (3) unlocking of the translated fingers 135.

Due to the unique, two phase operation of the motor means 327, slide subassembly 325 and jaw subassembly 324 it is possible to move the finger 135 through a random distance against the payload object 166, where the distance is defined by the size and rigidity of the payload object 166. Furthermore, the moveable force locking mechanism jaw subassembly 324 will self-lock against the payload object 166, relative to a rigid stationery object, the rod 322. Furthermore, it is possible to close the moveable force locking mechanism jaw subassembly 324 to any position along the rod 322 and lock the jaw subassembly 324 at such position.

One ability of the multiposition force locking mechanism is to close upon objects of various sizes and lock in one or more discrete positions. The force locking mechanism jaw subassembly 324 contains one or more jaw locking and release mechanisms that execute this task. A further ability of the force locking mechanism is to release the lock mode and return to an open position without the addition of a second motor means.

Jaw Locking and Release Mechanism

FIG. 16 shows a detailed view of the self-locking mechanism. The force locking mechanism jaw subassembly 324 contains the release sleeve 323. The release sleeve 323 slides easily within the jaw subassembly 324 and extends through the center of the conical ring 328. The plurality of steel balls 329 are contained within the conical ring 328 where they can be contacted by the release sleeve 323 when it is pressed all the way against the face of the jaw subassembly 324 as shown in FIG. 16. The steel balls 329 are held in place by retaining rings 331. The lock sleeve 330 extends inside the retaining ring 331 and can contact the steel balls 329.

Locking occurs when the lock sleeve 330 extends in and against the steel balls 329 forcing them to contact the conical ring 328 and the force track surface, in this case the rods 322. The angle 380 between the force track surface and the conical ring 328 must be small enough to provide a self-locking force between the cone, bearings and rod. If the angle 380 is too great, the steel balls 329 will slide free and self-locking does not occur. A further prerequisite of locking is that the jaw subassembly 324 must be forced in a direction consistent with (FIG. 16) the previous closure motion, creating the necessary forces to lock the steel balls 329 in place.

Once the steel balls 329 are locked firmly in place between the rod 322 and the conical ring 328, the position of the jaw subassembly 324 is locked relative to the position of the rod 322. Increased force from the payload object 166 will result in increased force between the rod 322, steel balls and jaw subassembly 324 resulting in a statically balanced condition. The jaw subassembly 324 cannot move in the positive X direction, regardless of the magnitude of the force exerted on the jaw subassembly by the payload object 166.

To release the jaw subassemblies 324, so that they are free to translate, it is necessary to move the release sleeves 323 relative to the jaw subassemblies 324 and terminate the forces between the steel balls 329 and conical ring 328. This is achieved when the motor means 326, 327 moves the slide subassembly 325, withdrawing the lock sleeve 330 and pressing the release sleeve 323 against the steel balls 329 as shown in FIG. 17. The only force that the release sleeve 323 encounters, other than minute friction, is the force against the steel balls 329. As shown in FIG. 17, this force becomes sufficient to move the steel balls 329 relative to the jaw subassembly 324, thereby releasing the self-locked mode and returning the force locking mechanism to its original unlocked condition.

Dynamic Analysis of the Operation of the Release Mechanism

As the force locking mechanism closes, very little force is exerted between the steel balls 329 and conical ring 328.

This is primarily due to the mass of the release sleeve 323 which slides on the rod 322. As the motor means 327 drives the jaw subassembly 324 closed, the inertia of the mass of the release sleeve 323, combined with the friction forces between the release sleeve 323 and the rod 322, force the release sleeve 323 against the steel balls 329. The steel balls 329 are trapped in a space between the release sleeve 323 and the lock sleeve 330 and the steel balls 329 are no longer able to physically contact the conical ring 328. The force locking mechanism continues this motion until a force is exerted upon the force locking mechanism jaw subassembly 324. Normally, this force would be the physical contact of the force locking mechanism fingers 135 and the payload object 166. At this instance the motor means 327 continues to drive towards a further closed position but the jaw subassembly 324 stops translation due to the forces encountered. The release sleeve 323 continues motion toward the "fingers opened direction" due to its momentum. The space 350 that existed between the release sleeve 323 and the lock sleeve 330 disappears at this instance and is replaced by a distance 355 between the conical ring 328 and the lock sleeve 330. The conical ring 328 however, is not moving as it is physically attached to the jaw subassembly 324 which has stopped translation. Therefore the lock sleeve 330 continues motion and presses the steel balls 329 rigidly against the wall of the conical ring 328 and against the outside diameter of the rod 322. Self-locking has occurred.

Once locked in place a high amount of force exists between the steel balls 329, the conical ring 328, and the rod 322. This force is sufficient to retain the jaw subassembly 324 in a self-lock mode. Additional force on the jaw subassembly 324 toward the center of the mechanism (reference is made to FIG. 16) will increase the normal forces between the conical ring 328, steel balls 329, and rod 322 as necessary to balance any finger force. Therefore the force locking mechanism remains self-locked.

The only functional way to release the force locking mechanism jaw subassembly 324 is to remove the steel balls 329 from the entrapped position between the conical ring 328 and rod 322. This is accomplished when the motor means 327 moves the release sleeve 323 toward the center of the mechanism until it contacts the steel balls 329. Further motion of the release sleeve 323 increases the force on the steel balls 329 until they move in toward the center of the mechanism. Force is exerted by the slide subassembly 325 against the release sleeve 323 and against the steel balls 329 until the edge of the release sleeve 323 contacts the jaw subassembly 324. At this instant self-locking is terminated and the jaw subassembly 324 begins to move inward. The slide subassembly 325 continues to apply force against the jaw subassembly 324. The steel balls 329 are constantly forced away from the conical ring 328 because of the mass and inertia of the jaw subassembly 324. Self-locking does not occur and the jaw subassembly 324 moves freely to the opened position.

Operation of the Multiposition Force Locking Mechanism

After fingers 135 are attached to the jaw subassembly 324, the force locking mechanism 318 is prepared to grip and move a payload object 366. FIG. 21 shows the force locking mechanism with fingers 135 centered, prior to opening on the payload object 366. The jaw subassembly 324 is translated by the motor means 327 until contact is made with the payload object 366. Contact with the payload object 366 will cause the jaw subassembly 324 to self-lock against the rods 322.

The force locking mechanism can be closed by reversing the forces applied by the motor means 327. The self-locked jaw subassembly 324 releases and moves to an central position. The payload object 366 is thereby released.

While specific embodiments of the invention have been disclosed herein, it is to be understood that the full use of modifications, substitutions and equivalents may be made without departing from the scope of the invention concept.

I claim:

1. A multiposition locking mechanism comprising:

a frame containing a track means;

jaw means having a release part and a conical surface, said jaw means linearly movable along said track means, said release part slidably movable along said track means and parallel to said jaw means;

slide means having a locking part, said slide means engageable with and slidably movable along said track means; and bearing means containing roller parts for establishing self-locking forces between said track means and said conical surface of said jaw means;

wherein said jaw means is finitely movable within said slide means along said track means.

2. A multiposition locking mechanism according to claim 1, wherein said jaw means independently translates a finite distance along said track means and within said slide means and said slide means continues to move relative to said jaw means after said jaw means has moved the finite distance.

3. A multiposition locking mechanism according to claim 2 wherein the translation of said locking part of said slide means and the translation of said jaw means together operatively affixes said jaw means relative to said frame and said track means.

4. A multiposition locking mechanism according to claim 1 wherein said release part of said jaw means displaces said bearing means thereby detaching said jaw means from said frame.

5. A multiposition locking mechanism according to claim 1 wherein said roller parts of said bearing means are selected from the group consisting of a plurality of bearing balls, a plurality of cylindrical bearings and a plurality of spherical roller bearings.

6. A multiposition locking mechanism according to claim 1 wherein said track means is at least one right circular cylinder.

7. A multiposition locking mechanism for use in industrial grippers capable of moving and locking and releasing a jaw means in more than one discrete position relative to a frame, the multiposition locking mechanism comprising:

a frame comprising a base, a motor means, a plurality of sideplates and at least one cylinder, said plurality of sideplates fixedly attached to said base, said at least one cylinder fixedly attached to at least two of said plurality of sideplates, said motor means contained within said frame;

jaw means comprising a jaw body, at least one release part, at least one conical surface and a plurality of bearing balls, said jaw means movable along said at least one cylinder, said at least one conical surface, said plurality of bearing balls and said at least one release part located generally between said jaw body and said at least one cylinder, said at least one release part movable along said at least one cylinder; and slide means comprising a plurality of sliding plates and a plurality of locking parts, at least one of said plurality of sliding plates attached to said motor means, said slide means movable along said at least one cylinder of said frame;

wherein said slide means moves said jaw means a random and varying distance depending on the forces exerted against said jaw means by a payload object being gripped by said jaw means; and wherein said slide means continues to move relative to said jaw means after said jaw means has moved the random and varying distance and stopped moving thereby temporarily affixing said jaw means relative to said frame means.

8. A multiposition locking mechanism according to claim 7 wherein said plurality of bearing balls are operatively affixed between said at least one cylinder and said at least one conical surface when locking said jaw means.

9. A multiposition locking mechanism according to claim 8 wherein said release part directly contacts said plurality of bearing balls and moves said bearing balls a finite distance thereby initiating a displacement of said jaw means when unlocking said jaw means.

10. A multiposition locking mechanism according to claim 7 wherein said at least one release part is slidably movable between said jaw means and said at least one cylinder.

11. A multiposition locking mechanism according to claim 7 wherein said jaw means is operatively attached to a finger means, and said finger means being primarily used to contact the payload object.

12. A multiposition locking mechanism according to claim 7 further comprising a stop part fixedly attached to said frame, said stop part inhibiting contact between said plurality of locking parts and said jaw means when said slide means is in a fully opened position.

13. A multiposition locking mechanism according to claim 7 wherein said jaw means is operatively affixed relative to said frame when said jaw means is in a locked position, and wherein said jaw means is capable of reacting equally against substantially infinite forces exerted by the payload object against said jaw means without a force input from said motor means when said jaw means is in the locked position.

14. A multiposition locking mechanism for use in industrial grippers capable of moving and locking and releasing a jaw means in more than one discrete position, the multiposition locking mechanism comprising:

a frame having at least one cylinder fixedly attached to said frame;

slide means having at least one lock part;

jaw means capable of translating a finite distance within said slide means;

at least one conical surface attached to said jaw means, said at least one conical surface having an angled surface;

a plurality of bearing balls; and at least one release part slidably movable relative to said jaw means.

15. A multiposition locking mechanism according to claim 14 wherein said at least one lock part operatively displaces said plurality of balls relative to said at least one conical surface thereby temporarily affixing said jaw means to said at least one cylinder.

16. A multiposition locking mechanism according to claim 15 wherein said jaw means further comprises a chamber space containing said at least one conical surface, and wherein the angle between said angled surface of said at least one conical surface and said at least one cylinder is substantially less than 45 degrees.

17. A multiposition locking mechanism according to claim 14 wherein said jaw means further comprises a chamber space containing said plurality of bearing balls, and wherein said at least one lock part and said at least one release part translate relative to said chamber space.

18. A multiposition locking mechanism according to claim 14 wherein said at least one release part operatively displaces said plurality of bearing balls relative to said at least one conical surface by a finite distance when unlocking said jaw means from said at least one cylinder.

19. A multiposition locking mechanism for use in industrial grippers capable of moving and locking and releasing a jaw means in more than one discrete position, the multiposition locking mechanism comprising:

a frame having at least one cylinder fixedly attached to said frame;

a slide means having at least one lock part;

a jaw means capable of translating a finite distance within said slide means;

at least one conical surface attached to said jaw means, said at least one conical surface having an angled surface;

a plurality of bearing balls; and at least one release part slidably movable relative to said jaw means;

wherein the multiposition locking mechanism moves to various distances, locks and releases said jaw means with a single input from a controller.

* * * * *